(12) United States Patent
Stähle (10) Patent No.: US 7,431,325 B2
(45) Date of Patent: Oct. 7, 2008

(54) STEERING ADAPTER FOR MOTOR VEHICLES

(76) Inventor: Kurt Stähle, Liebenzeller Straβe 16, D 75242 Neuhausen-Steinegg (DE)

( * ) Notice: Subject to any disclaimer, the term of this patent is extended or adjusted under 35 U.S.C. 154(b) by 271 days.

(21) Appl. No.: 11/178,501

(22) Filed: Jul. 12, 2005

(65) Prior Publication Data

US 2006/0012158 A1 Jan. 19, 2006

(30) Foreign Application Priority Data

Jul. 13, 2004 (DE) .................. 10 2004 033 741

(51) Int. Cl.
*G05G 1/00* (2006.01)
*G01B 21/26* (2006.01)

(52) U.S. Cl. .............. 280/727; 74/470; 74/552; 280/727; 73/862.01; 33/340

(58) Field of Classification Search ............ 74/494, 74/470, 567, 568 R, 568 M; 901/50; 73/116, 73/862.01, 862.041, 862.042, 862.08, 862.381, 73/625.49, 862.51, 863.01, 118.1; 33/203, 33/333, 331, 334; 280/771, 727; 248/227.1, 248/227.2, 227.4, 228.5, 203.5, 231.61
See application file for complete search history.

(56) References Cited

U.S. PATENT DOCUMENTS

| 3,003,363 | A | * | 10/1961 | De Hart ................. 74/494 |
| 3,465,577 | A | | 9/1969 | Donovan |
| 3,762,239 | A | * | 10/1973 | Rouis .................... 74/494 |
| 3,889,527 | A | * | 6/1975 | Wallace ................. 73/118.1 |
| 3,895,545 | A | * | 7/1975 | Hunter ................... 74/494 |
| 3,999,425 | A | | 12/1976 | Collin |
| 4,133,115 | A | * | 1/1979 | Stockholm ............... 33/371 |
| 4,262,618 | A | * | 4/1981 | VanDerZee ............ 114/144 R |
| 4,335,523 | A | * | 6/1982 | Bryant ................... 33/371 |
| 4,742,720 | A | * | 5/1988 | Storck ................... 73/865.9 |
| 4,893,413 | A | | 1/1990 | Merrill et al. |
| 5,105,546 | A | * | 4/1992 | Weise et al. ............. 33/203.12 |
| 5,309,788 | A | * | 5/1994 | Summerfield ............ 74/568 R |
| 5,795,997 | A | * | 8/1998 | Gittins et al. ............ 73/118.1 |
| 5,865,266 | A | | 2/1999 | Froelich et al. |
| 6,076,269 | A | * | 6/2000 | Sekino et al. ............ 33/371 |
| 2006/0012158 | A1 | * | 1/2006 | Stahle ................... 280/731 |

FOREIGN PATENT DOCUMENTS

EP 0 235 333 A1 9/1987

* cited by examiner

*Primary Examiner*—Ruth Ilan
*Assistant Examiner*—Karen Amores
(74) *Attorney, Agent, or Firm*—Browdy and Neimark, P.L.L.C.

(57) ABSTRACT

The steering wheel adapter for a motor vehicle has, for connection to a steering wheel, a rotatable retaining plate (10) with at least three retaining elements (11, 12, 13) that are displaceable within a circular segment formed by the upper region of the steering wheel (50) and whereby the steering wheel (50) is frictionally connectable to said retaining plate (10). This upper circular segment is used as a free space for coupling the steering adapter to the steering wheel, with all retaining elements that serve to clamp the steering wheel to said retaining plate being disposed within this free space so that their retaining force is generated against the steering wheel from the inside. In the steering wheel plane outside the steering wheel rim, no components are therefore required that could come into conflict with other components of the motor vehicle in the vicinity of the steering wheel.

19 Claims, 8 Drawing Sheets

STEERING ADAPTER FOR MOTOR VEHICLES

BACKGROUND OF THE INVENTION

The present invention relates to a steering wheel adapter for connecting a function unit to a steering wheel.

To steer a motor vehicle by means of a steering robot, or to measure steering movements or steering forces by means of a measurement steering wheel, an apparatus is required whereby a function unit (a drive or measuring device) is connectable to the steering wheel of the motor vehicle. This device is referred to as a steering adapter.

Robot drivers are known that incorporate connection elements to the steering wheel, Such drivers are disclosed, e.g., in EP 0 235 333, EP 0 236 518 B1, and DE 39 40 588. The robot drivers presented there, however, are used for the automated actuation of the pedals of the motor vehicle; the structural connection to the steering wheel in these cases serves exclusively to support the robot driver and hold it securely positioned.

U.S. Pat. No. 3,999,425 discloses a device for emission testing for a motor vehicle, wherein an activator for the accelerator is held by means of a rod between the steering wheel and floor plate. Here, too, the steering wheel rim serves as a mechanical counter support for a measuring apparatus. The steering wheel is not moved in the process, and the transfer or measurement of torques is of no importance for the purpose at hand of measuring the exhaust emission.

DE 33 03 588 A1 discloses a robot driver, which is designed also as a steering robot, wherein the steering wheel is actuated by means of a friction roller, which is driven and pressed against the outside of the steering wheel by a pneumatic cylinder. A torque for steering the motor vehicle is thus directly transmitted to the steering wheel from the outside.

U.S. Pat. No. 3,465,577 discloses a similar solution, namely a steering robot wherein a motor is used to exert a torque onto the outside of the steering wheel rim by means of two rollers.

U.S. Pat. No. 5,865,266 discloses a steering robot whose turning shaft is coupled to the steering wheel by means of an adapter. The torque transmission takes place by means of a screw connection of the adapter directly to the steering shaft.

U.S. Pat. No. 3,889,527 discloses a steering adapter that serves to receive a measuring device for measuring the deflections of a steered front wheel and connects this measuring device to the steering wheel. The steering adapter in this case moves with the steering wheel. Since this is merely a measuring device for the turning angle, a frictional connection between the steering adapter and steering wheel is not required and it is accordingly sufficient to suspend the steering adapter by means of an arc-shaped hanging mechanism at the top of the steering wheel, and to create, by means of components with a rubber cover that laterally project beyond the steering wheel and rest on top of the steering wheel, sufficient frictional engagement so that the measuring device can follow the steering movements via the steering adapter.

A basic problem in the design of a steering adapter lies in the fact that an adaptation to individual steering wheels must be possible in a simple manner also in the case of robot drivers where a torque transfer must take place from the steering adapter to the steering wheel, taking into account that specific groupings of actuation levers and switching elements (windshield wiper lever, lever-type light switch, automatic transmission shift levers, etc.) are typically disposed in the immediate vicinity of the steering wheel rim, limiting access to the steering wheel.

BRIEF SUMMARY OF THE INVENTION

The present invention provides a novel steering adapter that can be used on all known vehicle steering wheel types, that it is easy to install/uninstall, and that is suitable to transmit torques also when used in a robot driver.

According to the invention, there is provided a steering wheel adapter for connecting a function unit to a steering wheel that includes a plurality of spokes, the steering wheel enclosing an area having an upper region in the form of a segment of a circle bounded by the spokes, which adapter comprises:

a rotatable retaining plate connectable to the function unit; and retaining elements associated with the retaining plate and positionable within the segment of a circle for fixing the adapter to the steering wheel, the retaining elements being adjustable relative to the retaining plate for frictionally connecting the retaining plate to the steering wheel and for exerting on the steering wheel a clamping force from within the area enclosed by the steering wheel in order to enable the steering wheel to rotate with the retaining plate.

The invention is based on the premise that the upper segment of the circle enclosed by a steering wheel, which, as a rule, represents approximately one half of the total steering wheel area, is kept free of spokes or other structural or operating elements in all motor vehicles, since it must be assured, in almost all types of motor vehicles, that the driver have a clear view of the dashboard indicators.

The underlying concept of the invention is thus based on using this upper free space between the steering wheel rim and spokes to couple the steering adapter to the steering wheel in such a way that all retaining elements that serve to secure and clamp the steering wheel to the retaining plate are disposed within this free space of the steering wheel, so that all compression and clamping forces on the steering wheel are generated by movements of these retaining elements from the inside out. In this manner no components are required in the steering wheel plane that project beyond the steering rim, which could interfere with control elements potentially provided in the area of the steering wheel.

Advantageous embodiments of the invention relate to the structural cooperation between the retaining plate and the retaining elements and embodiments specifically designed for this purpose that permit especially a symmetrical coupling of a function unit to the retaining plate.

An additional advantageous feature provides for the function unit to be connectable to the vehicle body by means of an arm in such a way that a decoupling member is disposed such that shock-like vehicle body movements during the driving or simulation operation are kept away and so that, in particular, no distortions of the steering forces occur due to any twisting between the vehicle body and steering wheel.

The decoupling member may also be upgraded to include an indicator to indicate eccentricities while the steering wheel is being turned.

The function unit may be a drive for turning the steering wheel, in which case the configuration of the steering adapter and drive is a steering robot (active function unit). However, it may also be a measuring device for measuring steering movements or steering forces, in which case the configuration of the steering adapter and measuring device is a measurement steering wheel (passive function unit).

Additional advantageous embodiments of the inventive solution can be gleaned from the following description and claims.

BRIEF DESCRIPTION OF THE DRAWINGS

A preferred exemplary embodiment of the steering adapter according to the invention will now be described based on a steering robot, with reference to the accompanying drawings in which.

DETAILED DESCRIPTION OF THE INVENTION

In the illustrated exemplary embodiment, the steering adapter is used as part of a steering robot, i.e., the function unit is a drive, e.g., an electric motor 40.

This steering robot is composed of a retaining plate 10 having retaining elements 11, 12 and 13 on its underside for clamping-in the upper arc of a steering wheel 50. Retaining plate 10 is designed for this purpose in an arc shape or crescent shape, with its outer radius corresponding approximately to the average value of the outer radii of the most common steering wheels. In lieu of a retaining plate, other structural solutions (e.g., retaining arms) may also be chosen that are suitable both as counter supports for the retaining elements as well as for connecting the motor 40 rotating the steering wheel.

Figure 1:
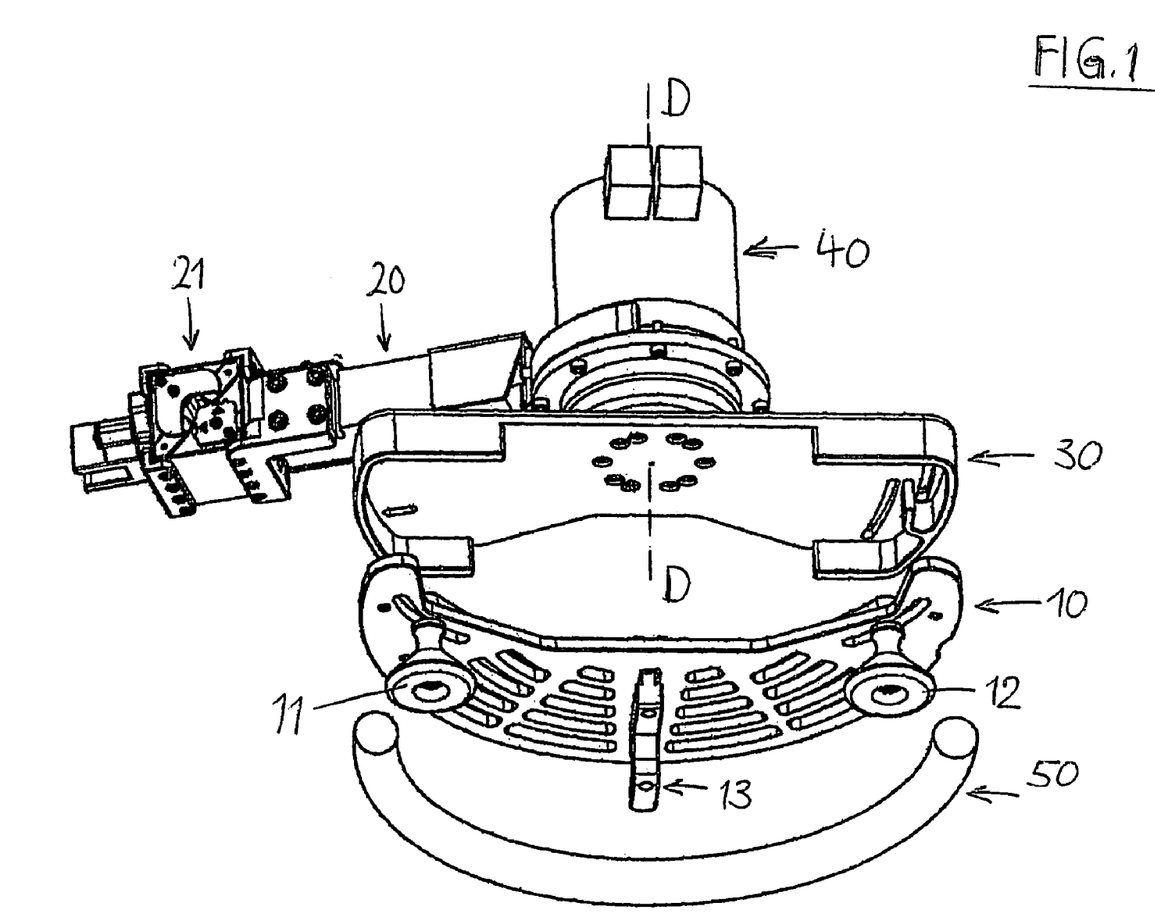
FIG. 1 is a first perspective exploded view of the steering robot as seen from below the retaining plate.

Retaining plate 10 provides a surface of engagement for a bracket-shaped housing 30, which is adjustably connectable at its opposed edge regions to the retaining plate 10 by means of screws 32 that are guided in longitudinal slots 31 and screwed into threaded bores in plate 10. Housing 30 is centrally connected to the rotary output shaft of motor 40, which shaft extend along axis D-D in FIG. 1 and, in turn, is connected by means of an arm 20 to a fixed vehicle body part on which it can be supported. When motor 40 is actuated, its rotary output shaft rotates about axis D-D, and the resulting torque is consequently transmitted via the fastening regions at the edges of housing 30 to retaining plate 10 and thereby to steering wheel 50 that is clamped between retaining plate 10 and retaining elements 11, 12, 13, and a steering movement is thus simulated.

Of particular importance for the invention, in order to achieve the coupling of the steering robot to the steering wheel rim exclusively from within the region enclosed by the steering wheel rim, is the fact that retaining elements 11, 12, 13 that cooperate with retaining plate 10 are specially designed with regard to their structure, and guidable and lockable in the retaining plate 10, as will be explained in more detail below with reference to FIGS. 3 through 6.

In the presented exemplary embodiment, three retaining elements are provided, with two lateral retaining elements 11 and 12 being arranged symmetrically slideable with respect to a symmetry axis S-S, and an upper central retaining element 13 that is slideable along the symmetry axis S-S.

The two lateral retaining elements 11, 12 each incorporate a cylindrical base 11A, 12A extending through a respective guide channel 14, 15, and adjoining each cylindrical base 11A, 12A, a respective truncated cone 11B, 12B forming a beveled clamping surface in the direction toward the plane of retaining plate 10. Cones 11B and 12B serve to press, or clamp, steering wheel 50 against retaining plate 10 in the retaining position in such a way that the controlling torque that is applied onto the retaining elements 11, 12 in the steering wheel plane, is converted according to the principle of the inclined plane, into a friction force that acts on the steering wheel perpendicular to the steering wheel plane, whereby a clamping of the steering wheel rim between the retaining elements and retaining plate is achieved.

Guide channels 14 and 15 are disposed in circular arc shapes in such a way that a displacement of the bases 11A, 12A results in a change of the distance of the bases from the symmetry axis S-S, so that the bases approach the outer edge of retaining plate 10 or the inner edge of steering wheel 50 to be grasped.

The upper end of each base 11A, 12A is connected to a respective adjusting rod 17, 18, whose other end is rotatably connected to a common adjusting slider 19 that is radially displaceable manually along the symmetry axis S-S on retaining plate 10. Because of the symmetry of the entire configuration to the symmetry axis S-S, this ensures that the two lateral retaining elements 11, 12 are equidistant from the symmetry axis S-S in every radial position of adjusting slider 19.

Figure 6:
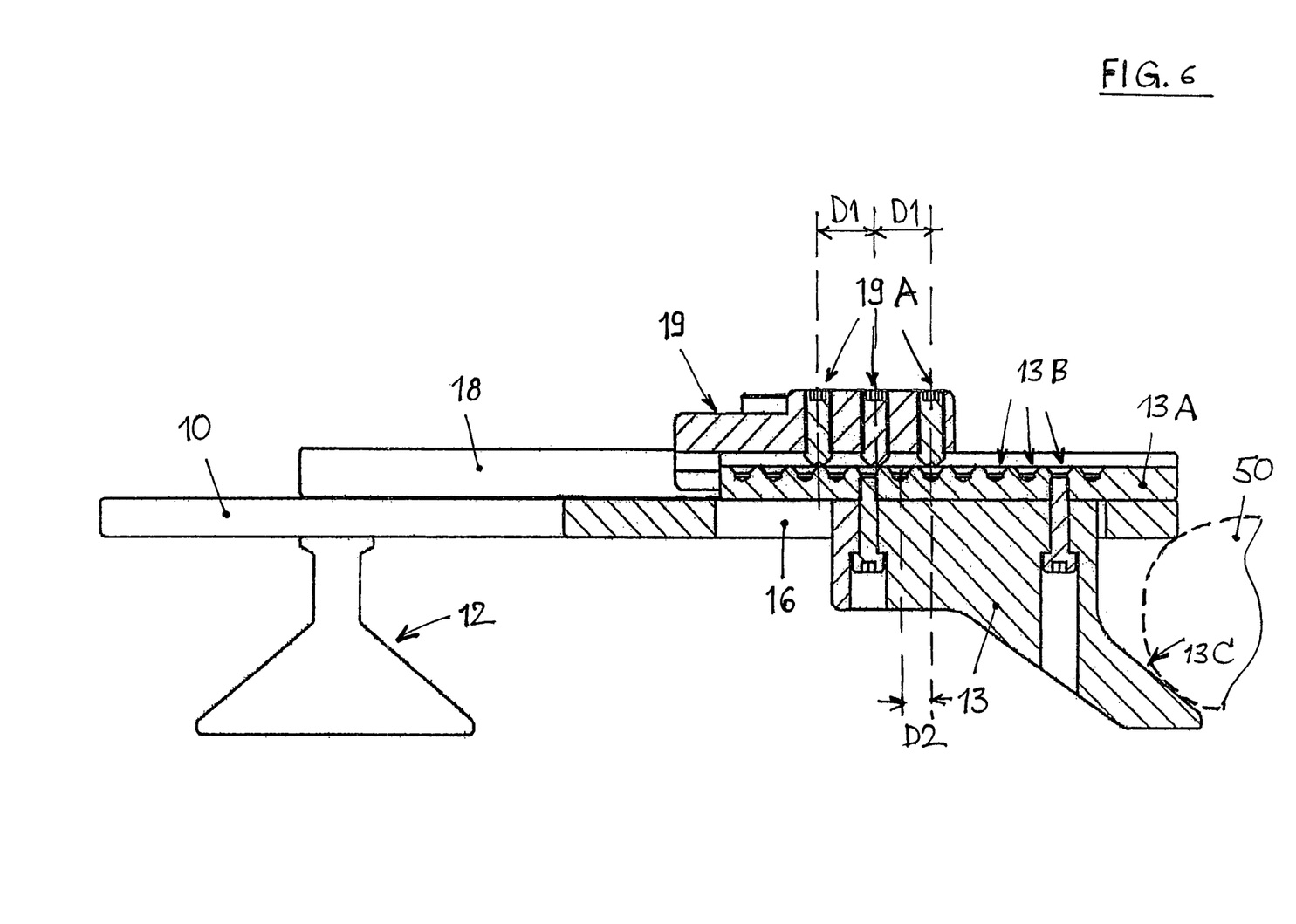
FIG. 6 is a longitudinal cross-sectional view along the line A-A of FIG. 5 through the retaining plate in the retaining position according to FIG. 5.

Referring to FIG. 6, third retaining element 13 is a clamping cam held in a radial guide channel 16 disposed in the symmetry axis S-S and having a beveled clamping surface 13C facing toward the steering wheel 50, which surface bears against the rim of steering wheel 50 in the retaining position and pushes it against retaining plate 10.

The third retaining element 13 extends through radial guide channel 16 and is connected by screws to a base 13A that rests on the top surface of plate 10 and has on its top a series of bores 13B in which screws 19A carried by adjusting slider 19 can be fixed in such a way that when the retaining or clamping position of the retaining plate 10 is reached on the steering wheel 50 by properly positioning the three retaining elements 11, 12, 13, a reliable securing of all three retaining elements to steering wheel 50 is possible with only one locking process.

Figure 4:
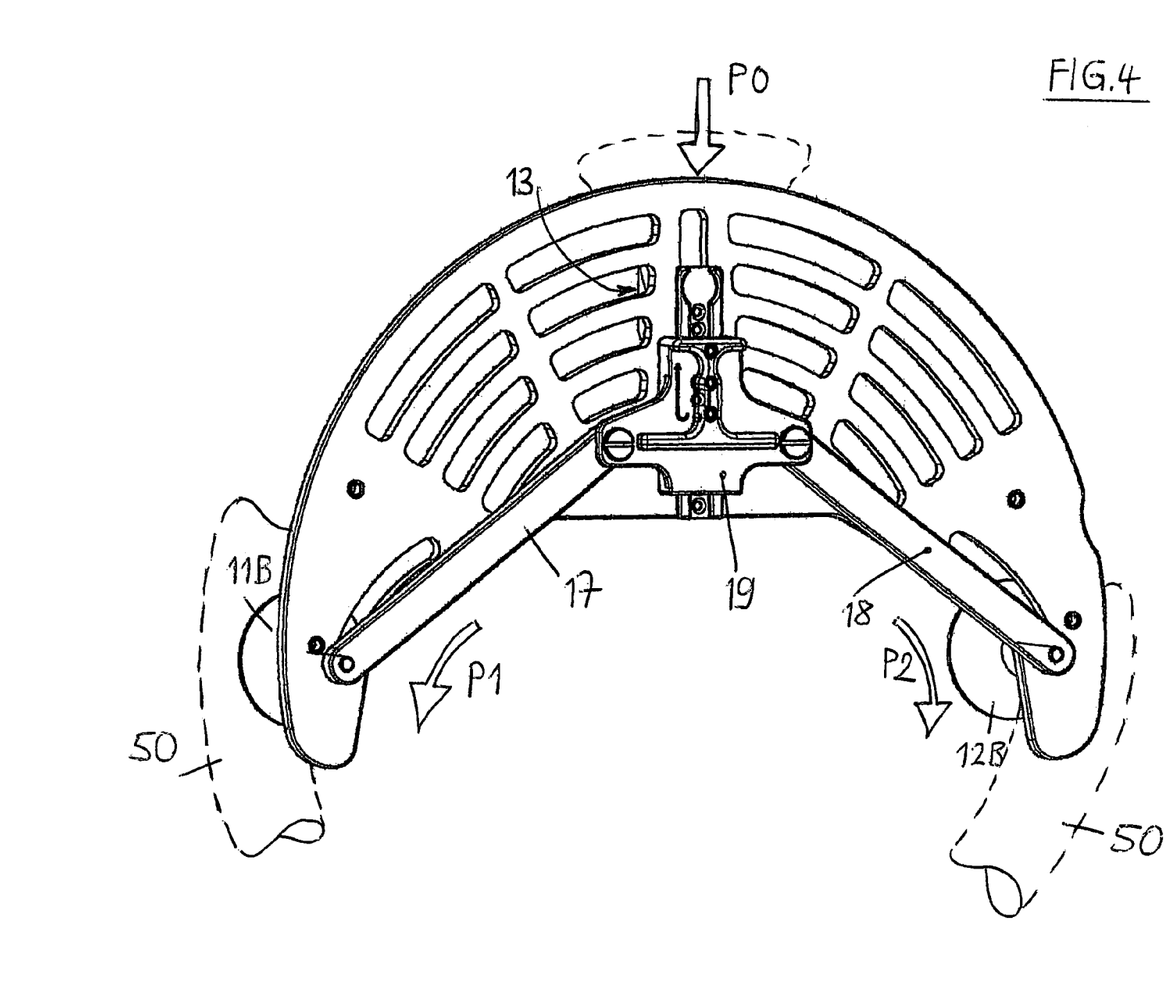
FIG. 4 is a second top view of the retaining plate in the retaining position of the two lateral retaining elements.
Figure 5:
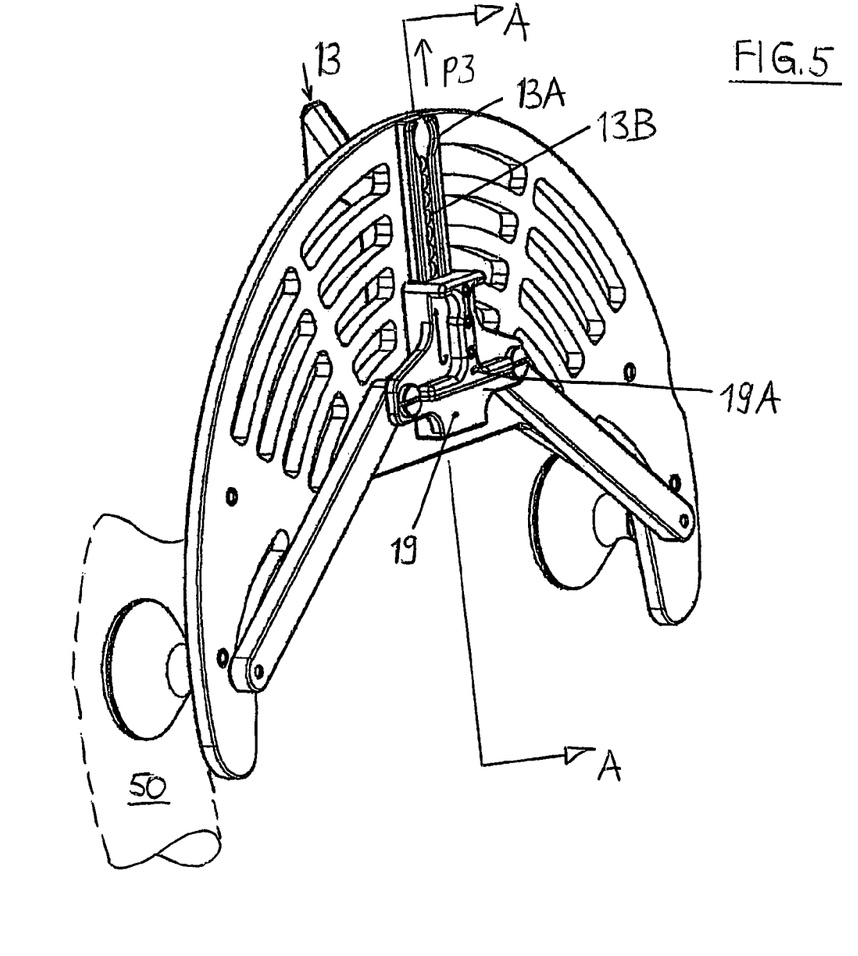
FIG. 5 is a third top view of the retaining plate in the retaining position of all three retaining elements.

The sequence of such a locking process will be described with reference to FIGS. 3 through 5.

Figure 3:
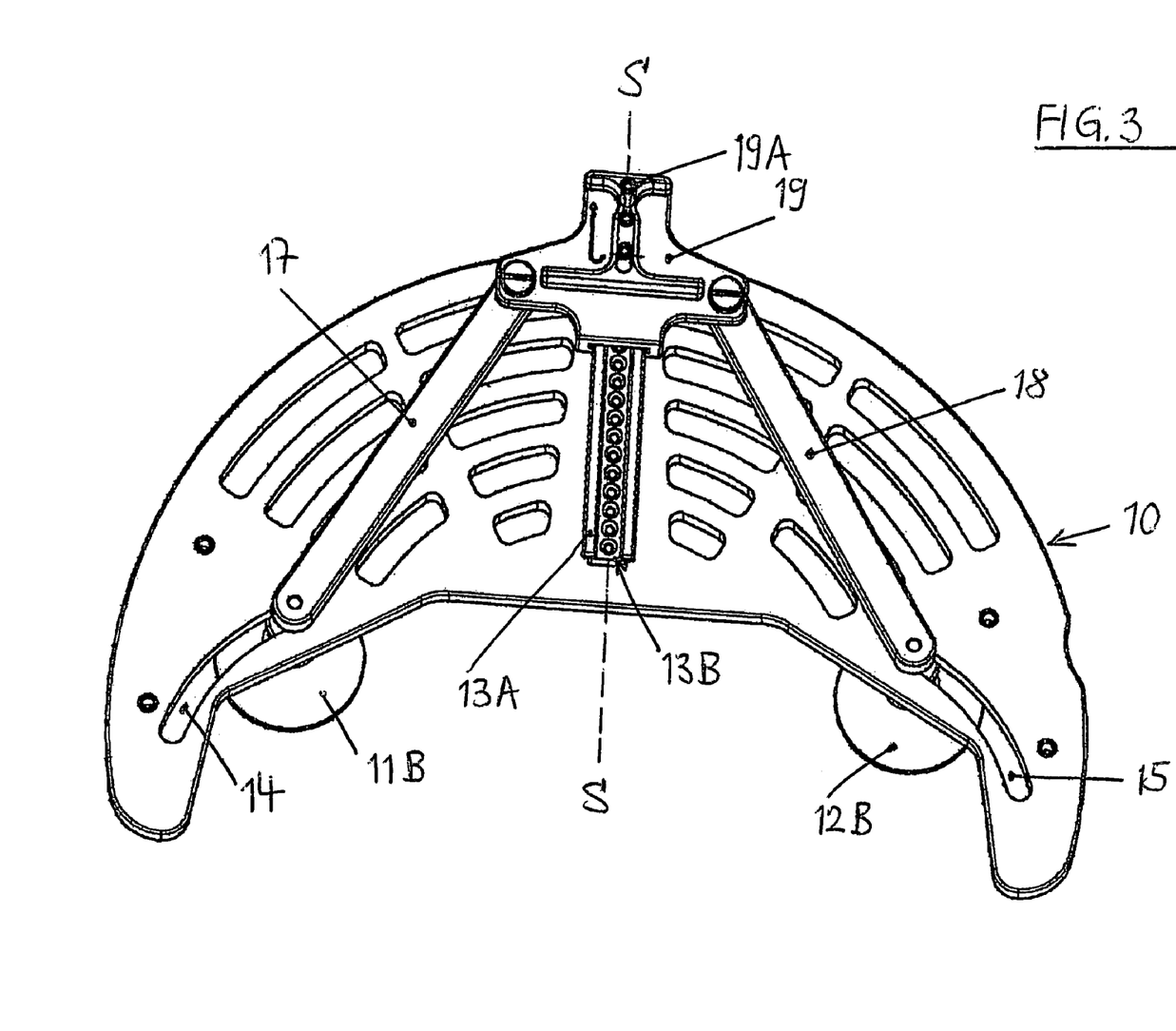
FIG. 3 is a first top view of the retaining plate in the disengaging position of the retaining elements.

In FIG. 3, retaining plate 10 with its retaining elements 11, 12, 13 is arranged in its disengaging condition, i.e., adjusting slider 19 is located in its radially outermost position on retaining plate 10, with the result that, due to the coupling of the two lateral retaining elements 11, 12 by means of the adjusting rods 17, 18, the two lateral retaining elements 11, 12 are located in a position in which their bases 11A, 12A are located at the inner ends of guide channels 14, 15. In this position, the two lateral retaining elements 11, 12 accordingly take positions at the shortest distance from one other. The upper, central retaining element 13 is also located in its disengaging position, i.e., its base 13A is located in the radially innermost position in its guide channel 16 on retaining plate 10.

With this configuration of the retaining elements, it is possible to place the entire arrangement consisting of motor 40, housing 30, and mounted retaining plate 10 against the upper free circular segment region of steering wheel 50 until the edge region of retaining plate 10 comes to rest on the upper edge region of the steering wheel and the retaining elements 11, 12, 13 extend through the steering wheel plane.

In this position, the first phase of the locking process starts (FIG. 4), during which, by exertion of a radially directed force P0 onto adjusting slider 19, the same is pushed radially inwardly, with the result that the adjusting rods 17, 18 push the two lateral retaining elements 11, 12 outwardly in their guide channels 14, 15 until the beveled clamping surfaces of truncated cones 11B, 12B contact the steering wheel rim and clamp steering wheel 50 between these truncated cones 11B, 12B and the underside of retaining plate 10 takes place, preferably in the corner regions between the upper section of the steering wheel rim and the two upper steering wheel spokes. The exertion of force in the direction of the arrow P0 accordingly results in a swivel movement in the direction of the arrows P1, P2 of the two lateral retaining elements 11, 12 until said corner positions are reached, where it results in a clamping of the steering wheel 50.

When this position is reached, upper, central retaining element 13 is grasped in the second phase of the locking process and pushed with its base 13A (arrow P3 in FIG. 5) until a secure clamping of the upper arc region of the steering wheel rim between the clamping surface 13C of central retaining element 13 and retaining plate 10 is achieved here as well (FIG. 6). In order to push element 13 radially outwardly, the user could reach between the adapter and the steering wheel from below and push against the surface of element 13 that faces away from clamping surface 13C.

The symmetry axis S-S in this clamping position should preferably extend through the rotary shaft of the steering wheel, in order to prevent eccentricities during subsequent movements of the steering robot.

To secure the clamped connection, an appropriate one of the adjusting screws 19A is fixed in one of the bores 13B in base 13A of the central retaining element 13 in a third phase of the locking process, with the spacing D1 between the three adjusting screws 19A in the adjusting lever 19, on the one hand, and the spacing D2 between the counter bores 13B, on the other hand, being selected in such a way that one adjusting screw 19A-counter bore 13B pair is always available to provide the required tight clamping of the steering wheel between the retaining plate and the three retaining elements under all circumstances with a single turning of one screw 19A.

In this manner, a tight coupling of the motor 40 to the steering wheel 50 is attained, with the rotary shaft of the motor 40 ideally being in alignment with the rotary shaft of the steering wheel, which can be achieved, if necessary, by adjusting the housing 30 on the retaining plate 10 by suitably positioning screws 32 in slots 31, whereby the rotary shaft axis D-D of the motor 40 can be displaced along the symmetry axis S-S until axis D-D is in alignment with the steering wheel axis.

The motor 40 is supported by arm 20 on a fixed vehicle body part, for example on the A-column of the vehicle body, to ensure that the torque exerted by motor 40 is transmitted to steering wheel 50.

Figure 2:
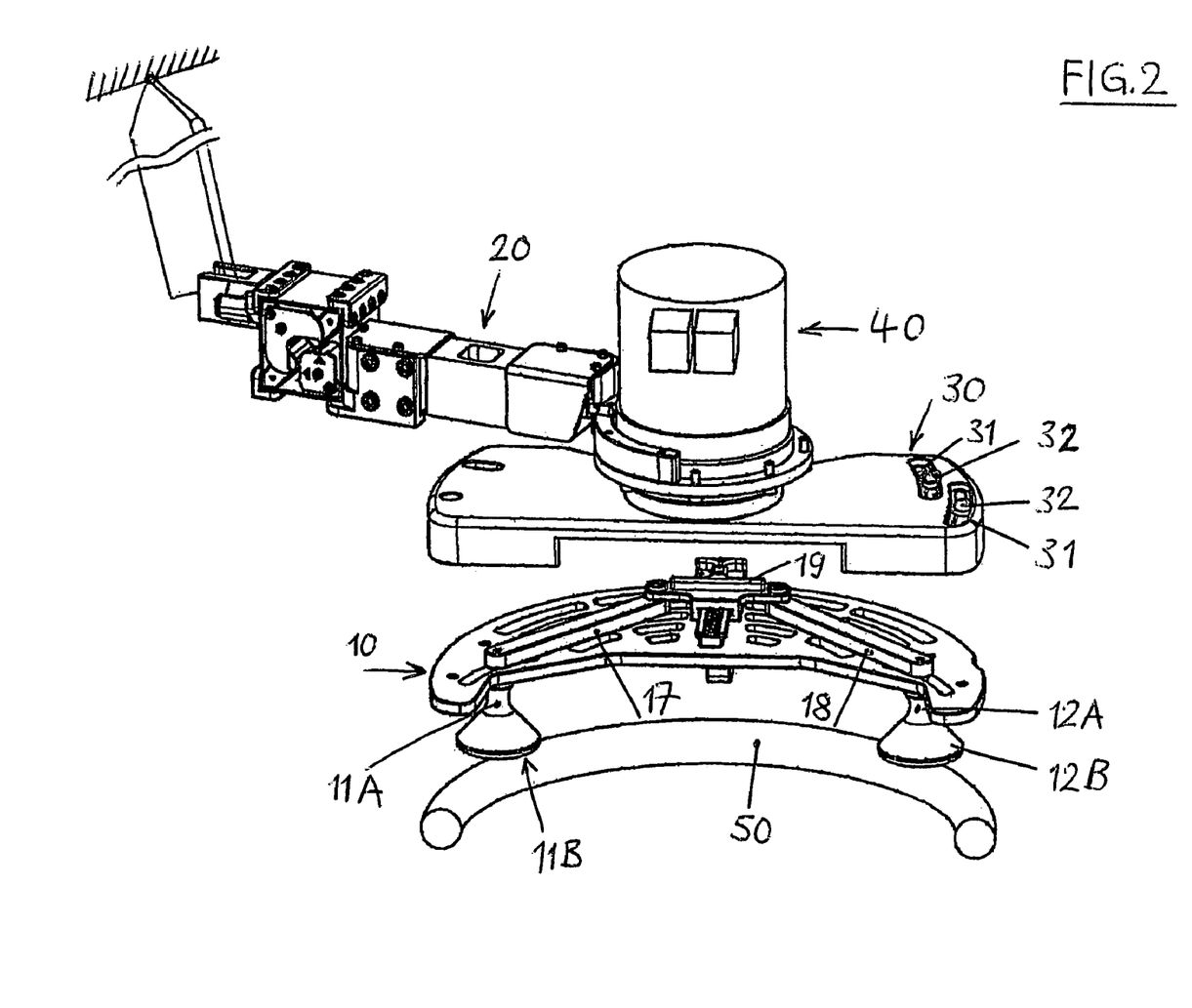
FIG. 2 is a second perspective exploded view of the steering robot as seen from above the retaining plate.

According to a preferred embodiment of the invention, arm 20 consists of a first section 20A, which is connected to motor 40, and a second section 20B, which is connected, for example, to the above-mentioned A-column, which is indicated schematically in the top left region of FIG. 2.

Figure 7:
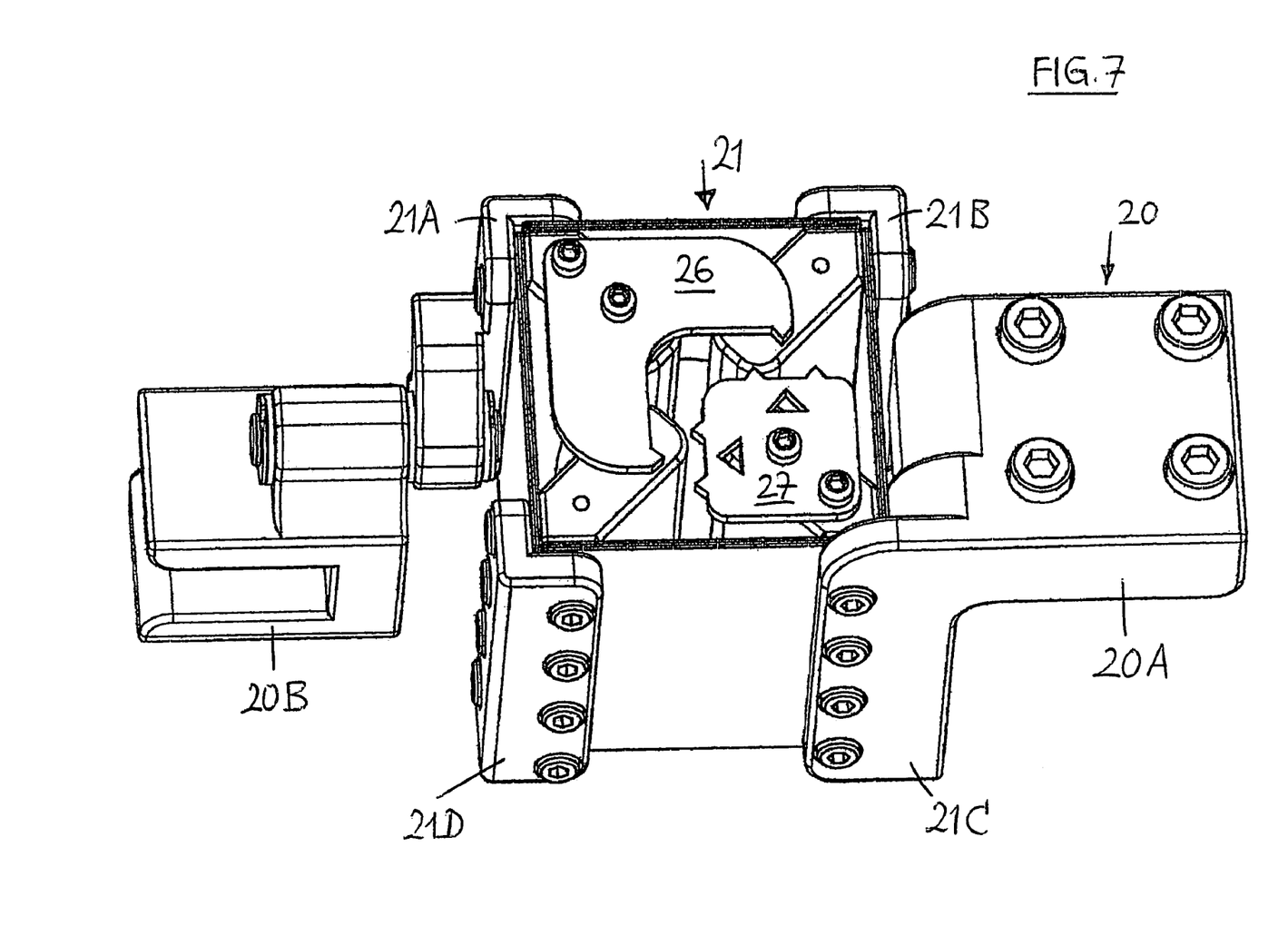
FIG. 7 is a perspective view of the decoupling member of the steering robot.
Figure 8:
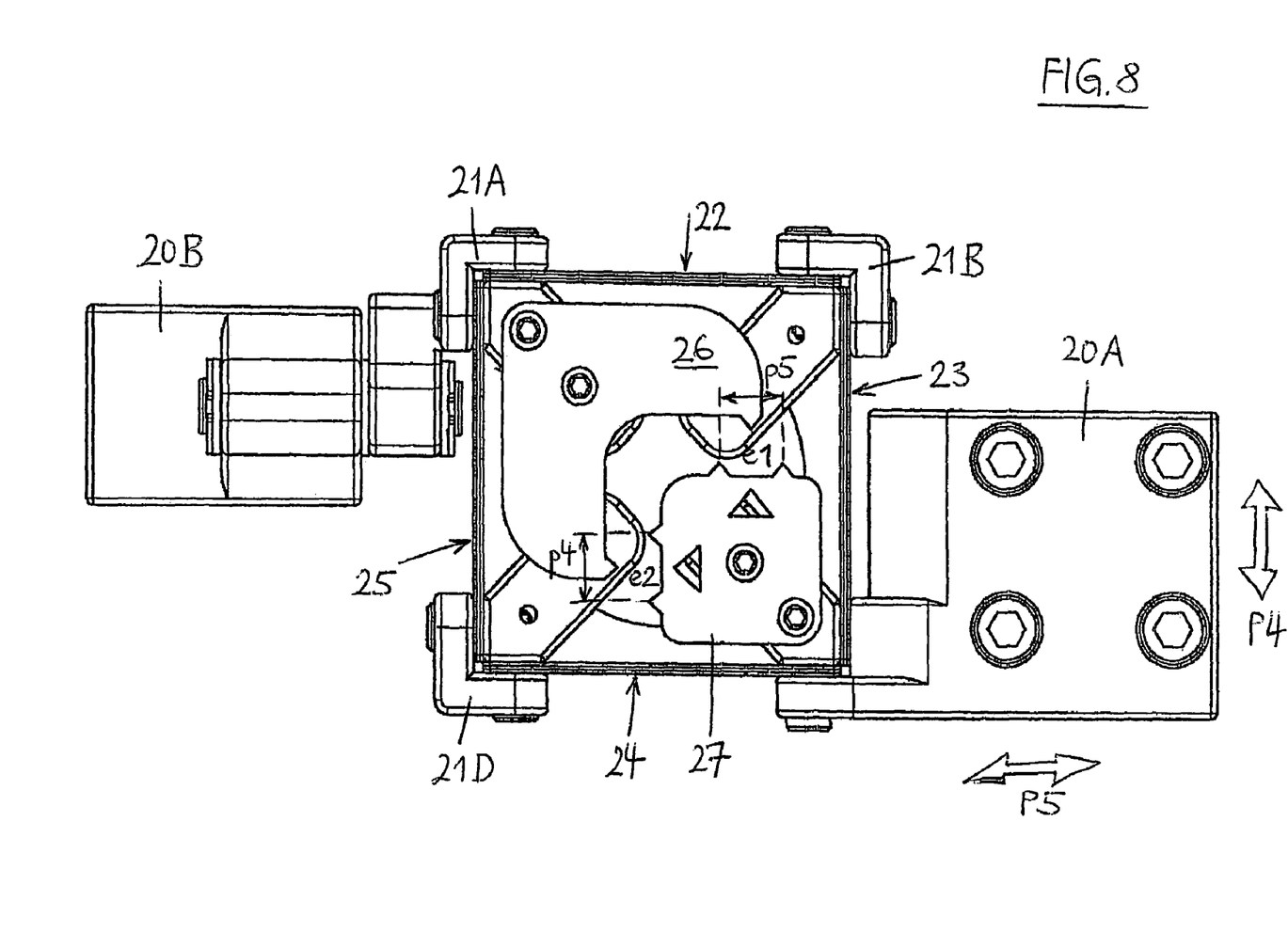
FIG. 8 is a top view of the decoupling member.

Between the two sections 20A, 20B, a decoupling member 21 is disposed, as shown in FIGS. 7 and 8.

Decoupling member 21 essentially consists of a plurality of leaf springs 22-25 that are connected together by corner brackets 21A-21D to form a rectangular or square box. This creates a structure that permits a displacement of the arm 20A relative to arm 20B in the plane of FIG. 8 (X-Y plane) in the directions of the double arrows P4, P5, but no displacement perpendicular to the X-Y plane (Z-axis).

The interposition of this decoupling member between sections 20A and 20B has the effect, on the one hand, that shock-like vehicle body movements during the driving or simulation operation, which could result in a distortion of the steering movements, are kept away from motor 40.

On the other hand, this configuration permits a measurement of the eccentricity effect during the actuation of the steering wheel, i.e., of the lateral displacements of motor 40, if the motor axis is not in alignment with the steering axis D-D.

Indicator elements 26, 27 are arranged in the plane of FIG. 8 (X-Y plane) and are connected to respective diametrically opposite corner brackets 21A, 21C. Elements 26 and 27 are appropriately shaped and dimensioned, e.g., so that indicator element 26 has two measuring arms and indicator 27 has a generally square shape. Each arm of indicator element 26 is provided near its end with a tip, or projection, that faces a respective side of indicator element 27, and each of the sides of indicator element 27 that faces a respective tip of indicator element 26 is provided with two tips, or projections, spaced apart by a distance p4, p5. Each of those sides of indicator element 26 is also provided with a triangular cut-out having an apex that will be aligned with the tip on the associated arm of indicator element 27 when the box formed by springs 22-25 is not deformed.

Movements of section 20A relative to section 20B in the directions of double arrows P4, P5 can provide a visual "measurement display". Indicator elements 26, 27 are attached to diametrically opposed corner brackets 21A, 21C, to which sections 20A, 20B are also connected. A displacement of section 20A relative to section 20B due to a steering eccentricity results in a parallelogram-like deformation of the square formed by leaf springs 22-25, with the result that matching measuring ranges p4, p5 become displayable whereby the degree of eccentricity e1 in the X-plane and the degree of eccentricity e2 in the Y-plane, i.e., the position of each tip on indicator element 26 relative to the associated pair of tips on indicator element 27 can be visually observed.

This display permits direct conclusions to be drawn regarding the direction and magnitude of the eccentricity to thus facilitate fine-tuning the position adjustment of housing 30 on retaining plate 10 by shifting screws 32 in slots 31 in the edge regions of housing 30.

It should be emphasized that the interposition of decoupling member 21 permits a more comfortable manipulation and adjustment of the steering robot, but it is not mandatory for its function.

If a measuring device is used as the function unit in lieu of motor 40, a measurement steering wheel is created for measuring and evaluating the steering movements of the steering wheel. The above described components with their specific advantages can be used with this type of application as well.

This application relates to subject matter disclosed in German Application number 10 2004 033 741.1, filed on Jul. 13, 2004, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A steering wheel adapter for connecting a function unit to a steering wheel that includes a plurality of spokes, the steering wheel enclosing an area having an upper region in the form of a segment of a circle bounded by the spokes, said adapter comprising:

a rotatable retaining plate connectable to the function unit; and retaining elements associated with said retaining plate and movable relative to said retaining plate into a retaining position within the segment of a circle for fixing said adapter to the steering wheel, said retaining elements being adjustable relative to said retaining plate for frictionally connecting said retaining plate to the steering wheel and for exerting on the steering wheel a clamping force from within the area enclosed by the steering wheel in order to enable the steering wheel to rotate with said retaining plate, wherein:

said retaining plate is provided with a respective guide channel far each at sail retaining elements in which said retaining elements are displaceable until they come into contact in their retaining positions with the steering wheel;

said retaining elements comprise two lateral retaining elements and an upper, central retaining element;

each at said two lateral retaining elements comprises a cylindrical base extending through the respective guide channel and a truncated cone adjoining said cylindrical base and forming the respective beveled clamping surface; and said steering wheel adapter further comprises:

two adjusting rods each having one end connected to a respective one of said lateral retaining elements at the side of said retaining plate that faces away from the steering wheel when said adapter is fixed to the steering wheel; and a common adjusting slider rotatably connected to the other end of each of said adjusting rods, said adjusting slider being radially displaceable on said retaining plate.

2. The steering wheel adapter according to claim 1, wherein each of said retaining elements has, at a distance from the plane of said retaining plate, a respective clamping surface that is bevelled in such a direction that each of said retaining elements pushes said retaining plate against the steering wheel when the retaining position is approached.

3. The steering wheel adapter according to claim 1, wherein said guide channel for said upper, central retaining element is a radial guide channel and said upper, central retaining element comprises a clamping cam guided in said radial guide channel and having a clamping surface adapted to face the steering wheel, said clamping cam contacting the steering wheel when in its retaining position.

4. The steering wheel adapter according to claim 1, wherein each of said guide channels for said two lateral retaining elements has an arc shape in said retaining plate such that a radial displacement of said adjusting slider toward the axis of rotation of the steering wheel effects an increase in the distance between said two lateral retaining elements symmetrically to the steering wheel axis of rotation until said two lateral retaining elements contact the steering wheel.

5. The steering wheel adapter according to claim 4, wherein said guide channel for said upper, central retaining element is a radial guide channel said upper, and said central retaining element comprises a base on which said adjusting slider is guided, said base extending through said radial guide channel, and said adapter further comprises locking means between said base and said adjusting slider to lock said central retaining element together with said two lateral retaining elements on the steering wheel in their retaining positions.

6. The steering wheel adapter according to claim 5, wherein said base is provided with at least one counter bore and said locking means comprise adjusting screws held in said adjusting slider, said adjusting screws being spaced apart by a distance to assure that at least one of said adjusting screws is fixable in a corresponding counter bore in said base of said central retaining element when said retaining elements are in their retaining positions.

7. The steering wheel adapter according to claim 1, further comprising a housing adjustably connectable at its edges to said retaining plate for coupling the function unit to said retaining plate, said housing being adapted to extend over said adjusting slider and said adjusting rods when said housing is connected to said retaining plate.

8. The steering wheel adapter according to claim 7, further comprising an arm for connecting the function unit to the body of a motor vehicle in which the steering wheel is installed.

9. The steering wheel adapter according to claim 8, wherein said arm comprises two arm sections and a decoupling member that couples said two arm sections together and at least attenuates the transmission of shock-like vehicle body movements to the function unit.

10. The steering wheel adapter according to claim 9, wherein said decoupling member comprises a plurality of leaf springs and a plurality of corner brackets connecting said leaf springs together to form a rectangular box, and said arm sections are each connected to said decoupling member at a respective one of two diametrically opposite corners of said box.

11. The steering wheel adapter according to claim 10, wherein:

the function unit has a part that rotates about a first axis of rotation and the steering wheel rotates about a second axis of rotation;

said decoupling member further comprises an indicator unit composed of two indicator elements each connected to a respective one of two diametrically opposite corners of said box in such a way that, when the first and second axes are not aligned with one another, rotation of the function unit part and the steering wheel produce a parallelogram-like deformation of said box and a resulting defined displacement of said indicator elements relative to one another to cause said indicator unit to provide an indication that facilitates coaxial alignment of the first and second axes.

12. The steering wheel adapter according to claim 1, wherein the function unit is an electric motor.

13. The steering wheel adapter according to claim 1, wherein the function unit is a measuring device operative to record and evaluate steering movements of the steering wheel.

14. A steering wheel adapter for connecting a function unit to a steering wheel that includes a plurality of spokes, the steering wheel enclosing an area having an upper region in the form of a segment of a circle bounded by the spokes, said adapter comprising:

a rotatable retaining plate connectable to the function unit; and retaining elements associated with said retaining plate and movable relative to said retaining plate into a retaining position within the segment of a circle for fixing said adapter to the steering wheel, said retaining elements being adjustable relative to said retaining plate for frictionally connecting said retaining plate to the steering wheel and for exerting on the steering wheel a clamping force from within the area enclosed by the steering wheel in order to enable the steering wheel to rotate with said retaining plate, wherein:

said retaining elements comprise two lateral retaining elements; and said steering wheel adapter further comprises:

two adjusting rods each having one end connected to a respective one of said lateral retaining elements at the side of said retaining plate that faces away from the steering wheel when said adapter is fixed to the steering wheel; and a common adjusting slider rotatably connected to the other end of each of said adjusting rods, said adjusting slider being radially displaceable on said retaining plate.

15. The steering wheel adapter according to claim 14, further comprising a housing adjustably connectable at its edges to said retaining plate for coupling the function unit to said retaining plate, said housing being adapted to extend over said adjusting slider and said adjusting rods when said housing is connected to said retaining plate.

16. The steering wheel adapter according to claim 15, further comprising an arm for connecting the function unit to the body of a motor vehicle in which the steering wheel is installed.

17. The steering wheel adapter according to claim 16, wherein said arm comprises two arm sections and a decoupling member that couples said two arm sections together and at least attenuates the transmission of shock-like vehicle body movements to the function unit.

18. The steering wheel adapter according to claim 17, wherein said decoupling member comprises a plurality of leaf springs and a plurality of corner brackets connecting said leaf springs together to form a rectangular box, and said arm sections are each connected to said decoupling member at a respective one of two diametrically opposite corners of said box.

19. The steering wheel adapter according to claim 18, wherein:

the function unit has a part that rotates about a first axis of rotation and the steering wheel rotates about a second axis of rotation;

said decoupling member further comprises an indicator unit composed of two indicator elements each connected to a respective one of two diametrically opposite corners of said box in such a way that, when the first and second axes are not aligned with one another, rotation of the function unit part and the steering wheel produce a parallelogram-like deformation of said box and a resulting defined displacement of said indicator elements relative to one another to cause said indicator unit to provide an indication that facilitates coaxial alignment of the first and second axes.

* * * * *